US009633281B2

(12) United States Patent
Fan et al.

(10) Patent No.: US 9,633,281 B2
(45) Date of Patent: Apr. 25, 2017

(54) POINT CLOUD MATCHING METHOD

(71) Applicant: Nokia Technologies Oy, Espoo (FI)

(72) Inventors: Lixin Fan, Tampere (FI); Yu You, Kangasala (FI); Furong Peng, Ultimo (AU); Qiang Wu, Ultimo (AU); Jian Zhang, Ultimo (AU)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/714,723

(22) Filed: May 18, 2015

(65) Prior Publication Data
US 2015/0339541 A1 Nov. 26, 2015

(30) Foreign Application Priority Data

May 22, 2014 (GB) .................................. 1409125.0

(51) Int. Cl.
*G06K 9/62* (2006.01)
*G06T 7/00* (2017.01)
(52) U.S. Cl.
CPC ............ *G06K 9/623* (2013.01); *G06T 7/0024* (2013.01); *G06T 7/0028* (2013.01); *G06T 7/0075* (2013.01); *G06T 2200/04* (2013.01); *G06T 2207/10028* (2013.01); *G06T 2207/20016* (2013.01)
(58) Field of Classification Search
CPC .......... G06K 2209/40; G06K 2209/401; A61B 6/022; G06T 2207/20228; G06T 7/0057; G06T 7/0065; G06T 7/0073; G06T 7/0075; G06T 7/0077; G01B 11/25
USPC ........ 382/154, 287, 294, 181, 209, 278, 279
See application file for complete search history.

(56) References Cited

U.S. PATENT DOCUMENTS

2013/0151210 A1* 6/2013 Kallay .................. G06T 7/0051
703/2
2013/0245828 A1* 9/2013 Tateno .................. B25J 9/1697
700/259

FOREIGN PATENT DOCUMENTS

JP          EP 2639766 A1 *  9/2013 ............. B25J 9/1697

OTHER PUBLICATIONS

Keightley, Keir E., and Gerald W. Bawden. "3D volumetric modeling of grapevine biomass using Tripod LiDAR." Computers and Electronics in Agriculture 74.2 (2010): 305-312.*

(Continued)

*Primary Examiner* — Bhavesh Mehta
*Assistant Examiner* — Narek Zohrabyan
(74) *Attorney, Agent, or Firm* — Alston & Bird LLP

(57) ABSTRACT

Abstract A method comprising: providing a first three-dimensional (3D) point cloud obtained according to a first sensing technique, a second 3D point cloud obtained according to a second sensing technique and a first radius of a sphere covering a real object underlying the second first 3D point cloud and a second radius of a sphere covering a real object underlying the second 3D point cloud; defining scales of the first 3D point cloud and the second 3D point cloud based on said first radius and second radius; searching statistically substantially similar candidate regions between the first 3D point cloud and the second 3D point cloud using an ensemble shape function (ESF); aligning the statistically substantially similar candidate regions between the first 3D point cloud and the second 3D point cloud at least in vertical direction; and ranking the aligned candidate regions between the 3D point clouds based on their structural similarity.

20 Claims, 2 Drawing Sheets

(56) References Cited

OTHER PUBLICATIONS

Figure 3:
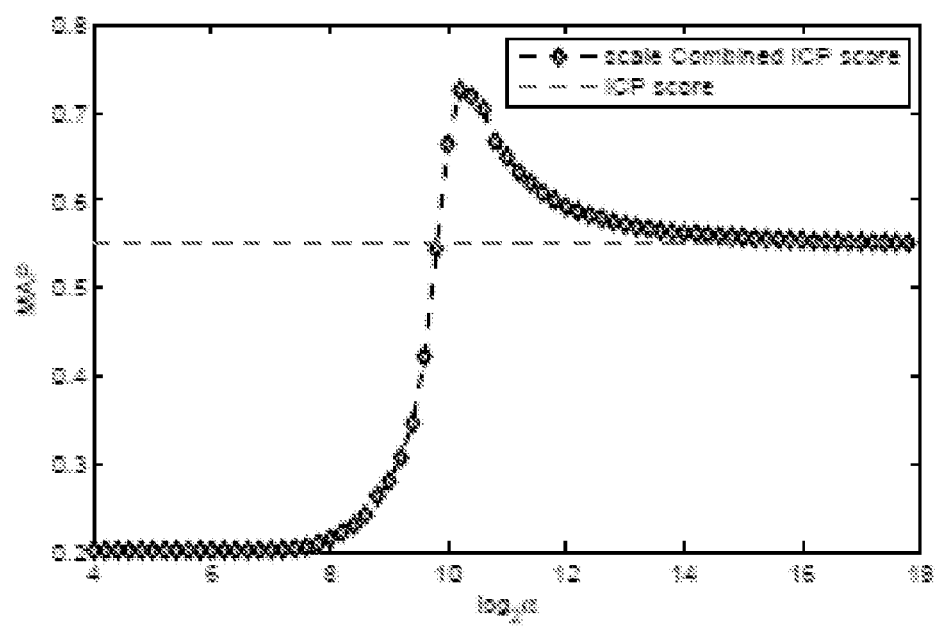

Demantke, Jerome, et al. "Dimensionality based scale selection in 3D lidar point clouds." The International Archives of the Photogrammetry, Remote Sensing and Spatial Information Sciences 38.Part 5 (2011): W12.*

Zhao, Wenyi, David Nister, and Steve Hsu. "Alignment of continuous video onto 3D point clouds." IEEE transactions on pattern analysis and machine intelligence 27.8 (2005): 1305-1318.*

Pylvänäinen, Timo, et al. "3D city modeling from street-level data for augmented reality applications." 2012 Second International Conference on 3D Imaging, Modeling, Processing, Visualization & Transmission. IEEE, 2012.*

"LIDAR—Light Detection and Ranging—Is a Remote Sensing Method Used to Examine the Surface of the Earth", National Oceanic and Atmospheric Administration, Retrieved on May 25, 2015, Webpage available at : http://oceanservice.noaa.gov/facts/lidar.html.

Snavely et al., "Photo Tourism: Exploring Photo Collections In 3D", ACM Transactions on Graphics, vol. 25, No. 3, Jul. 2006, pp. 835-846.

Wohlkinger et al., "Ensemble of Shape Functions for 3d Object Classification", IEEE International Conference on Robotics and Biomimetics, Dec. 7-11, 2011, pp. 2987-2992.

Besl et al., "A Method for Registration of 3-D Shapes", IEEE Transactions on Pattern Analysis and Machine Intelligence, vol. 14, No. 2, Feb. 1992, pp. 239-256.

Bariya et al., "3D Geometric Scale Variability in Range Images: Features and Descriptors", International Journal of Computer Vision, vol. 99, No. 2, Sep. 2012, 24 pages.

Sipiran et al., "Key-Component Detection on 3d Meshes Using Local Features", Proceedings of the 5th Eurographics Workshop on 3D Object Retrieval, 2012, 8 pages.

Petrelli et al., "On the Repeatability of the Local Reference Frame for Partial Shape Matching", IEEE International Conference on Computer Vision, Nov. 6-13, 2011, 8 pages.

Tombari et al., "Performance Evaluation of 3D Keypoint Detectors", International Journal of Computer Vision, vol. 102, No. 1-3, Mar. 2013, pp. 198-220.

Huang et al., "Point Cloud Matching Based on 3d Self-Similarity", IEEE Computer Society Conference on Computer Vision and Pattern Recognition Workshops, Jun. 16-21, 2012, pp. 41-48.

Steder et al., "Point Feature Extraction on 3d Range Scans Taking Into Account Object Boundaries", IEEE International Conference on Robotics and Automation, May 9-13, 2011, 8 pages.

Search Report received for corresponding United Kingdom Patent Application No. 1409125.0, dated Nov. 21, 2014, 5 pages.

* cited by examiner

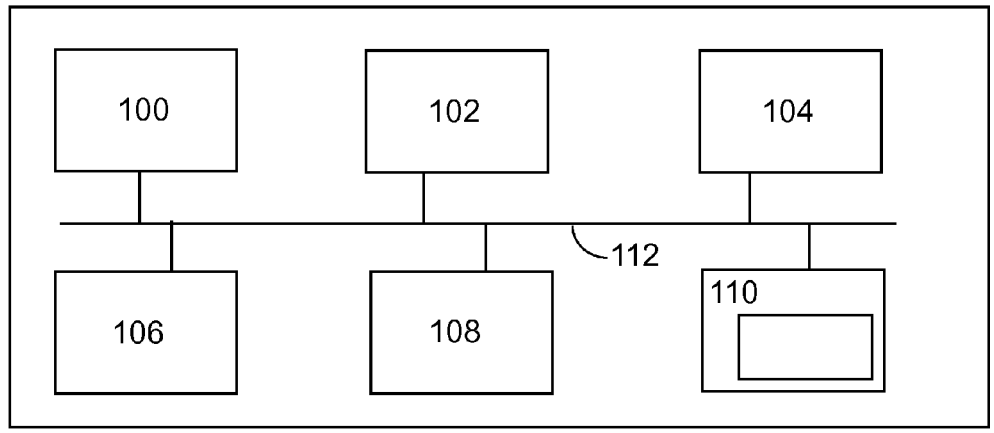

Fig. 1

Provide a first 3D point cloud of a first sensing technique, a second 3D point cloud of a second sensing technique and radii of spheres covering real objects underlying the first and second 3D point clouds (200)

Define scales of the first and second 3D point clouds based on said radii of spheres (202)

Search statistically similar candidate regions between the first 3D point cloud and the second 3D point cloud using an ESF (204)

Align the statistically similar candidate regions between the first 3D point cloud and the second 3D point cloud at least in vertical direction (206)

Rank the aligned candidate regions between the 3D point clouds based on their structural similarity (208)

Fig. 2

POINT CLOUD MATCHING METHOD

FIELD OF THE INVENTION

The present invention relates to image processing, and more particularly to matching point clouds of different source.

BACKGROUND OF THE INVENTION 3D point clouds are used in various image processing and computer vision applications. 3D point clouds are sets of data points in a 3D coordinate system typically representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. For example, in Structure-From-Motion (SFM), three-dimensional structures are estimated from two-dimensional image sequences, where the observer and/or the objects to be observed move in relation to each other. In Light Detection And Ranging (LiDAR) method, distances are measured by illuminating an object with a laser beam and analyzing the reflected light. The resulting data is stored as point clouds.

In applications of multiple views, combining several point clouds into a global consistent data set is typically required. The problem of matching a given set of 3D point clouds with another is a challenging task in computer vision. This problem becomes even more challenging when two sets of points are yielded by different sensing techniques.

Typically, point clouds obtained by different sensing techniques may be incompatible at least in terms of scale, point density, noise and/or sampling area.

SUMMARY OF THE INVENTION

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, a method according to the invention is based on the idea of providing a first three-dimensional (3D) point cloud obtained according to a first sensing technique, a second 3D point cloud obtained according to a second sensing technique and a first radius of a sphere covering a real object underlying the first 3D point cloud and a second radius of a sphere covering a real object underlying the second 3D point cloud; defining a scale of the first 3D point cloud based on said first radius and a scale of the second 3D point cloud based on said second radius; searching statistically substantially similar candidate regions between the first 3D point cloud and the second 3D point cloud using an ensemble shape function (ESF); aligning the statistically substantially similar candidate regions between the first 3D point cloud and the second 3D point cloud at least in vertical direction; and ranking the aligned candidate regions between the 3D point clouds based on their structural similarity.

According to an embodiment, the first 3D point cloud is obtained using Light Detection And Ranging (LiDAR) technique and the second 3D point cloud is obtained using Structure-From-Motion (SFM) technique.

According to an embodiment, the method further comprises determining multiple radii of spheres covering the real object underlying the first 3D point cloud obtained using LiDAR technique; defining multiple scales of said first 3D point cloud on the basis of said multiple radii; and searching statistically substantially similar candidate regions between the multiple scales of said first 3D point cloud and the second 3D point cloud using the ESF.

According to an embodiment, the method further comprises searching said statistically substantially similar candidate regions between the first 3D point cloud and the second 3D point cloud using a multi-resolution ensemble shape function, wherein at least said first 3D point cloud is processed in at least two different 3D resolutions.

According to an embodiment, the method further comprises searching said statistically substantially similar candidate regions between the first 3D point cloud and the second 3D point cloud using a first lower resolution for said first 3D point cloud; selecting a subset of candidate regions of said first 3D point cloud, which are statistically substantially similar to the second 3D point cloud; and searching, from said subset of candidate regions, statistically substantially similar candidate regions between the first 3D point cloud and the second 3D point cloud using a second higher resolution for said first 3D point cloud.

According to an embodiment, the method further comprises ranking the aligned candidate regions between the 3D point clouds according to an iterative closest point (ICP) method, wherein search of similarities between the first 3D point cloud and the second 3D point cloud is carried out in vertical direction.

According to an embodiment, the method further comprises adjusting results of the ICP method by a scale factor in order to take into account differences in the radius of the spheres covering the real objects underlying the second 3D point clouds.

According to a second aspect, there is provided an apparatus comprising at least one processor, memory including computer program code, the memory and the computer program code configured to, with the at least one processor, cause the apparatus to at least: provide a first three-dimensional (3D) point cloud obtained according to a first sensing technique, a second 3D point cloud obtained according to a second sensing technique and a first radius of a sphere covering a real object underlying the second first 3D point cloud and a second radius of a sphere covering a real object underlying the second 3D point cloud; define a scale of the first 3D point cloud based on said first radius and a scale of the second 3D point cloud based on said second radius; search statistically substantially similar candidate regions between the first 3D point cloud and the second 3D point cloud using an ensemble shape function (ESF); align the statistically substantially similar candidate regions between the first 3D point cloud and the second 3D point cloud at least in vertical direction; and rank the aligned candidate regions between the 3D point clouds based on their structural similarity.

According to a third aspect, there is provided a computer readable storage medium stored with code thereon for use by an apparatus, which when executed by a processor, causes the apparatus to perform: provide a first three-dimensional (3D) point cloud obtained according to a first sensing technique, a second 3D point cloud obtained according to a second sensing technique and a first radius of a sphere covering a real object underlying the first 3D point cloud and a second radius of a sphere covering a real object underlying the second 3D point cloud; define a scale of the first 3D point cloud based on said first radius and a scale of the second 3D point cloud based on said second radius; search statistically substantially similar candidate regions between the first 3D point cloud and the second 3D point cloud using an ensemble shape function (ESF); align the statistically substantially similar candidate regions between the first 3D point cloud and the second 3D point cloud at least in vertical direction; and rank the aligned candidate regions between the 3D point clouds based on their structural similarity.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a computer graphics system suitable to be used in a 3D point cloud analysis process according to an embodiment;

FIG. 2 shows a flow chart of a 3D point cloud matching process process according to an embodiment of the invention; and FIG. 3 shows a table of identification accuracy in an experiment carried out according to an embodiment of the invention.

DESCRIPTION OF EMBODIMENTS

FIG. 1 shows a computer graphics system suitable to be used in image processing, for example in 3D point cloud analysis process according to an embodiment. The generalized structure of the computer graphics system will be explained in accordance with the functional blocks of the system. For a skilled man, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 is a conventional processing unit arranged to process data within the data processing system. The memory 102, the storage device 104, the input device 106, and the output device 108 are conventional components as recognized by those skilled in the art. The memory 102 and storage device 104 store data within the data processing system 100. Computer program code resides in the memory 102 for implementing, for example, a 3D point cloud analysis process. The input device 106 inputs data into the system while the output device 108 receives data from the data processing system and forwards the data, for example to a display. The data bus 112 is a conventional data bus and while shown as a single line it may be a combination of a processor bus, a PCI bus, a graphical bus, and an ISA bus. Accordingly, a skilled man readily recognizes that the apparatus may be any conventional data processing device, such as a computer device, a personal computer, a server computer, a mobile phone, a smart phone or an Internet access device, for example Internet tablet computer. The input data of the 3D point cloud analysis process according to an embodiment and means for obtaining the input data are described further below.

It needs to be understood that different embodiments allow different parts to be carried out in different elements. For example, various processes of the 3D point cloud analysis may be carried out in one or more processing devices; for example, entirely in one computer device, or in one server device or across multiple user devices The elements of the 3D point cloud analysis process may be implemented as a software component residing on one device or distributed across several devices, as mentioned above, for example so that the devices form a so-called cloud.

3D point clouds are used in various image processing and computer vision applications. 3D point clouds are sets of data points in a 3D coordinate system typically representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. In Structure-From-Motion (SFM), three-dimensional structures are estimated from two-dimensional image sequences, where the observer and/or the objects to be observed move in relation to each other. The obtained geometric models are stored as 3D point clouds.

In Light Detection And Ranging (LiDAR) method, distances are measured by illuminating an object with a laser beam (e.g. ultraviolet, visible, or near-infrared light) and analyzing the reflected light. The resulting data is stored as point clouds. The LiDAR point clouds may be considered a set of vertices in a three-dimensional coordinate system, wherein a vertex may be represented by a planar patch defined by a 3D vector.

In applications of multiple views, combining several point clouds into a global consistent data set is typically required. The problem of matching a given set of 3D point clouds with another is a long standing open question in computer vision. This problem becomes even more challenging when two sets of points are yielded by different sensing techniques, e.g. one obtained from LiDAR while the other is obtained from Structure-From-Motion (SFM).

Due to requirements of different use cases, the general task of matching point clouds can be instantiated as two concrete subtasks:

Point cloud detection. This refers to finding "subsets of the large point cloud" that are similar to the other small point cloud. The detection outcome is 3D locations; i.e. x, y, z coordinates of centers of detected subsets and r radius of spheres for covering detected subsets.

Point cloud registration. This refers to the process of establishing point-to-point correspondence between two sets of point clouds, and subsequently, deriving the transformation matrix to represent established point-to-point correspondence in a parametric manner.

Existing 3D point cloud detection and registration methods are developed to typically work with point clouds that are yielded by the same sensing technology. Cross sourced point cloud matching, however, imposes a number of challenges that often obstruct existing methods from working:

1. Scale difference: Most existing methods assume there is no significant scale change between two point clouds. This assumption, however, is not fulfilled for cross sourced point clouds. When using SFM to reconstruct point cloud from sequence pictures, there is an unknown scale parameter of the reconstructed point cloud. On the other hand, LiDAR point cloud is sampled by laser that can be calibrated according to the earth coordinates, As a result, LiDAR point cloud value reveals the real essence (e.g. size and scale) of physical object.

2. Density difference: Most existing methods assume that the two point clouds in question are of similar densities. This assumption, again, is not fulfilled for cross sourced point clouds. Usually, the LiDAR point cloud is much denser than the SFM point cloud. For instance, the LiDAR point cloud of a building normally contains more than millions of points while the SFM point cloud of the same object often has dozens of thousands of points.

3. Noise difference: The measurement error is unavoidable for both LiDAR and SFM techniques. For the former, incurred noisy points are often due to the hardware calibration errors and exhibit as low-frequency position drifts or "ghost points" in the measurements. For SFM, erroneous points are often due to the mismatching of image keypoints and exhibit as spurious points detached from main structures.

4. Difference in sampling areas: It is not uncommon that, for the same object, two point clouds may have certain areas that are covered by one sensor but not covered by the other sensor. This may be caused by the sampling locations, angles, time and reconstructing methods.

5. Computation and accuracy. Since the LiDAR data is a typical big data, the computing complexity of a matching algorithm has to be taken into account such that it is not feasible to apply a time-consuming method to large LiDAR database.

Herein below, a novel approach for cross sourced point cloud matching is presented, which utilizes a two-stage matching framework integrating coarse detection and fine registration of two cross sourced point clouds.

The method according to the embodiment is illustrated in FIG. 2. In the method, a first three-dimensional (3D) point cloud obtained according to a first sensing technique, a second 3D point cloud obtained according to a second sensing technique and a first radius of a sphere covering a real object underlying the first 3D point cloud and a second radius of a sphere covering a real object underlying the second 3D point cloud are provided (200). A scale of the first 3D point cloud is defined based on said first radius and a scale of second 3D point cloud is defined (202) based on said second radius. Then statistically substantially similar candidate regions between the first 3D point cloud and the second 3D point cloud are searched (204) using an ensemble shape function (ESF). The statistically substantially similar candidate regions between the first 3D point cloud and the second 3D point cloud are aligned (206) at least in vertical direction, and the aligned candidate regions between the 3D point clouds are ranked (208) based on their structural similarity.

In other words, the above method may be interpreted such that it addresses challenges in cross sourced point clouds matching by a two-stage matching algorithm, namely, coarse detection and fine registration. In the coarse detection stage, the unnecessary candidate point clouds are removed by using a global descriptor Ensemble Shape Function (ESF), which is robust to high noise levels. In the fine registration stage, a suitable registration algorithm is applied to establish point-to-point correspondence and to rank the candidate point clouds according to the algorithm measuring the similarity between two point clouds.

The Ensemble Shape Function (ESF) is described more in detail for example in "Ensemble of shape functions for 3D object classification," by W. Wohlkinger and M. Vincze in 2011 IEEE International Conference on Robotics and Biomimetics (ROBIO), 2011, pp. 2987-2992.

According to an embodiment, the first 3D point cloud is obtained using Light Detection And Ranging (LiDAR) technique and the second 3D point cloud is obtained using Structure-From-Motion (SFM) technique. Even though the method is applicable to a variety of 3D sensing techniques, the advantages obtained by many embodiments become especially apparent when the cross sourced point clouds matching is applied between LiDAR and SFM point clouds.

According to an embodiment, the method further comprises determining multiple radii of spheres covering the real object underlying the first 3D point cloud obtained using LiDAR technique; defining multiple scales of said first 3D point cloud on the basis of said multiple radii; and searching statistically substantially similar candidate regions between the multiple scales of said first 3D point cloud and the second 3D point cloud using the ESF.

In the 3D point clouds obtained using LiDAR technique, it may be difficult determine a reliable single radius for LiDAR data. Therefore multiple radii may be determined for LiDAR data, and the searching of similar regions may be carried out across different radius settings. Since the radius is related to scale value calculation, the searching may be referred to as multi scale searching.

According to an embodiment, the method further comprises searching said statistically substantially similar candidate regions between the first 3D point cloud and the second 3D point cloud using a multi-resolution ensemble shape function, wherein at least said first 3D point cloud is processed in at least two different 3D resolutions.

Herein, the ensemble shape function is modified such that the ESF is computed in points of different resolutions to explore the hierarchy structure information. Based on experiments, too low resolution will deteriorate the discrimination of the ESF and too high resolution will increase the computing complexity. Thus, two suitable resolutions are adopted in order to optimize the processing efficiency.

According to an embodiment, said two resolutions are 64-resolution and 32-resolution. The points in 64-resolution are obtained by resizing the original points into a 64×64×64 voxel cube. In the cube, each voxel takes place of the points it covers. The points in 32-resolution are computed in 32×32×32 voxel cube.

According to an embodiment, the method further comprises searching said statistically substantially similar candidate regions between the first 3D point cloud and the second 3D point cloud using a first lower resolution for said first 3D point cloud; selecting a subset of candidate regions of said first 3D point cloud, which are statistically substantially similar to the second 3D point cloud; and searching, from said subset of candidate regions, statistically substantially similar candidate regions between the first 3D point cloud and the second 3D point cloud using a second higher resolution for said first 3D point cloud.

Thus, the course detection is conducted by applying the lower and the higher resolutions via the ESF. During the course detection process, false candidates are progressively reduced by a two-round detection. In the first round, the candidate regions are detected in the lower (e.g. 32) resolution. Those candidate regions of the first 3D point cloud, for example LiDAR point cloud, which are similar with the second 3D point cloud, for example SFM point cloud, in rough structure are kept and considered as the input of the second round. In the second round, the candidate regions are detected in the higher (e.g. 64) resolution. The second round removes at least a majority of the false candidate regions that are not similar with the second 3D point cloud, for example SFM point cloud, in finer structure.

According to an embodiment, the method further comprises ranking the aligned candidate regions between the 3D point clouds according to an iterative closest point (ICP) method, wherein search of similarities between the first 3D point cloud and the second 3D point cloud is carried out in vertical direction.

The iterative closest point (ICP) method is commonly used for registration and gains success in many fields such as mobile robots, medical imaging and 3D-map. However, successful registration through the ICP requires that the target and reference have been aligned roughly. Herein, the reference point cloud is typically located in a large scene e.g. about a city, due to which it is not a trivial task to transform the target point cloud to be close to the reference.

Therefore, the ICP method is modified such that the search of similarities between the first 3D point cloud and the second 3D point cloud is carried out in vertical direction.

This approach takes advantages of the fact that in urban environment, building facets are typically perpendicular to the ground surface, and therefore two point clouds can be initialized along vertical direction and restrict the ICP algorithm to search along the vertical direction during iterative optimization process. Then the vertical directions of the point clouds from LiDAR and SFM can be aligned.

In addition to the vertical direction, the centroid of the point clouds may also be aligned before ICP registration. Then multiple poses may be obtained to enhance the reliability of the results. The SFM point clouds may be rotated along the vertical direction, for example, with four angles of 0, 90, 180 and 270 degrees respectively to obtain four initial poses for ICP. As the vertical direction of the SFM point cloud is not determined, another four poses, obtained by inverting the SFM point cloud, are initialized for ICP. Thus, for example eight poses in total may be used as ICP initial input.

The iterative closest point (ICP) method is disclosed more in detail for example in "A method for registration of 3-D shapes," by P. J. Besl and H. D. McKay, IEEE Trans. Pattern Anal. Mach. Intell., vol. 14, no. 2, pp. 239-256, February 1992.

The output of the conventional ICP method is the fitness score of ICP, which is considered as the similarity between each candidate and the target. The value of the ICP score can be used to find the most similar candidate. However, the problem in matching cross sourced 3D point clouds is that the candidates regions are generated as multiple-scale spheres, which increases ambiguity for obtaining reliable similarity comparison results.

According to an embodiment, the method further comprises adjusting results of the ICP method by a scale factor in order to take into account differences in the radius of the spheres covering the real objects underlying the second 3D point clouds. Thus, the scale impact is considered with ICP fitness score.

It is known that a very small point cloud (e.g. points collapsed in a point) can be aligned with any point cloud. Herein, experiments with different size of candidate regions have shown that the ICP fitness score of small scale candidates, in the mass, is smaller than that of large scale candidates.

To alleviate the impact of scale, the ICP fitness score is adjusted by a scale penalty such that $$S = \exp(-r^2/\alpha) \times \text{ICP score} \quad (1.)$$

where S is the similarity, $\exp(-r^2/\alpha)$ is the scale penalty, r is the radius of the scanning sphere, $\alpha$ is a parameter for controlling the penalty of the scale and ICP score is the ICP fitness score.

The table in FIG. 3 shows that ICP fitness score adjusted by the scale penalty outperforms the ICP fitness score, provided that the parameter $\alpha$ is properly selected. In the table, the ability of locating similarities is evaluated by the information retrieval measurement, i.e. the mean average precision (MAP). The dotted line represents the baseline of the ICP fitness score as a MAP value, and the curve of diamonds represents the MAP as a function of the parameter $\alpha$. It can be seen in the table that if the value of the parameter $\alpha$ is about $2^{10}$-$2^{12}$ (about 1000-4000), the ICP fitness score adjusted by the scale penalty clearly outperforms the baseline ICP fitness score. This is because the ICP fitness score is generally smaller in small scale than in large scale. By penalizing the ICP fitness score in small scale, more correct candidate regions can be found in top ranks.

A skilled person appreciates that any of the embodiments described above may be implemented as a combination with one or more of the other embodiments, unless there is explicitly or implicitly stated that certain embodiments are only alternatives to each other.

As confirmed by the experiments, the various embodiments may provide advantages over state of the art. The proposed method enables to match cross sourced 3D point clouds from various 3D sensing techniques. Especially, the experiments show that the proposed two-stage approach can successfully register the target SFM point cloud to the reference in LiDAR point cloud. The two-stage approach reduces the number of suitable candidate regions very efficiently and ranks the remaining candidate regions in reliable manner.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

The invention claimed is:

1. A method comprising:
providing a first three-dimensional (3D) point cloud obtained according to a first sensing technique, a second three-dimensional point cloud obtained according to a second sensing technique and a first radius of a sphere covering a real object underlying the first three-dimensional point cloud and a second radius of a sphere covering a real object underlying the second three-dimensional point cloud;
defining a scale of the first three-dimensional point cloud based on said first radius and a scale of the second three-dimensional point cloud based on said second radius;
searching at least some candidate regions between the first three-dimensional point cloud and the second three-dimensional point cloud using an ensemble shape function (ESF);

aligning the searched candidate regions between the first three-dimensional point cloud and the second three-dimensional point cloud at least in a vertical direction; and ranking the aligned candidate regions between the three-dimensional point clouds based on their structural similarity.

2. The method according to claim 1, wherein the first three-dimensional point cloud is obtained using Light Detection And Ranging (LiDAR) technique and the second three-dimensional point cloud is obtained using Structure-From-Motion (SFM) technique.

3. The method according to claim 2, the method further comprising:
determining multiple radii of spheres covering the real object underlying the first three-dimensional point cloud obtained using Light Detection And Ranging technique;
defining multiple scales of said first three-dimensional point cloud on the basis of said multiple radii; and
searching at least some candidate regions between the multiple scales of said first three-dimensional point cloud and the second three-dimensional point cloud using the ensemble shape function (ESF).

4. The method according to claim 1, the method further comprising:
searching at least some candidate regions between the first three-dimensional point cloud and the second three-dimensional point cloud using a multi-resolution ensemble shape function, wherein at least said first three-dimensional point cloud is processed in at least two different three-dimensional resolutions.

5. The method according to claim 4, the method further comprising:
searching at least some candidate regions between the first three-dimensional point cloud and the second three-dimensional point cloud using a first lower resolution for said first three-dimensional point cloud;
selecting a subset of candidate regions of said first three-dimensional point cloud; and
searching, from said subset of candidate regions, at least some candidate regions between the first three-dimensional point cloud and the second three-dimensional point cloud using a second higher resolution for said first three-dimensional point cloud.

6. The method according to claim 1, the method further comprising:
ranking the aligned candidate regions between the three-dimensional point clouds according to an iterative closest point (ICP) method, wherein a search between the first three-dimensional point cloud and the second three-dimensional point cloud is carried out in the vertical direction.

7. The method according to claim 6, the method further comprising
adjusting results of the iterative closest point method by a scale factor in order to take into account differences in the radius of the spheres covering the real objects underlying the second three-dimensional point clouds.

8. An apparatus comprising at least one processor, and memory including computer program code, the memory and the computer program code configured to, with the at least one processor, cause the apparatus to at least:
provide a first three-dimensional (3D) point cloud obtained according to a first sensing technique, a second three-dimensional point cloud obtained according to a second sensing technique and a first radius of a sphere covering a real object underlying the first three-dimensional point cloud and a second radius of a sphere covering a real object underlying the second three-dimensional point cloud;
define a scale of the first three-dimensional point cloud based on said first radius and a scale of the second three-dimensional point cloud based on said second radius;
search at least some candidate regions between the first three-dimensional point cloud and the second three-dimensional point cloud using an ensemble shape function (ESF);
align the searched candidate regions between the first three-dimensional point cloud and the second three-dimensional point cloud at least in a vertical direction; and
rank the aligned candidate regions between the three-dimensional point clouds based on their structural similarity.

9. The apparatus according to claim 8, wherein the first three-dimensional point cloud is obtained using Light Detection And Ranging (LiDAR) technique and the second three-dimensional point cloud is obtained using Structure-From-Motion (SFM) technique.

10. The apparatus according to claim 9, wherein said computer program code is configured to, with the at least one processor, cause the apparatus to at least:
determine multiple radii of spheres covering the real object underlying the first three-dimensional point cloud obtained using Light Detection And Ranging technique;
define multiple scales of said first three-dimensional point cloud on the basis of said multiple radii; and
search at least some candidate regions between the multiple scales of said first three-dimensional point cloud and the second three-dimensional point cloud using the ensemble shape function (ESF).

11. The apparatus according to claim 8, wherein said computer program code is configured to, with the at least one processor, cause the apparatus to at least:
searching at least some candidate regions between the first three-dimensional point cloud and the second three-dimensional point cloud using a multi-resolution ensemble shape function, wherein at least said first three-dimensional point cloud is processed in at least two different three-dimensional resolutions.

12. The apparatus according to claim 11, wherein said computer program code is configured to, with the at least one processor, cause the apparatus to at least:
search at least some candidate regions between the first three-dimensional point cloud and the second three-dimensional point cloud using a first lower resolution for said first three-dimensional point cloud;
select a subset of candidate regions of said first three-dimensional point cloud; and
search, from said subset of candidate regions, at least some candidate regions between the first three-dimensional point cloud and the second three-dimensional point cloud using a second higher resolution for said first three-dimensional point cloud.

13. The apparatus according to claim 8, wherein said computer program code is configured to, with the at least one processor, cause the apparatus to at least:
rank the aligned candidate regions between the three-dimensional point clouds according to an iterative closest point (ICP) method, wherein a search between the first three-dimensional point cloud and the second three-dimensional point cloud is carried out in the vertical direction.

14. The apparatus according to claim 13, wherein said computer program code is configured to, with the at least one processor, cause the apparatus to at least:
adjust results of the iterative closest point method by a scale factor in order to take into account differences in the radius of the spheres covering the real objects underlying the second three-dimensional point clouds.

15. A non-transitory computer readable storage medium stored with code thereon for use by an apparatus, which when executed by a processor, causes the apparatus to perform:
providing a first three-dimensional (3D) point cloud obtained according to a first sensing technique, a second three-dimensional point cloud obtained according to a second sensing technique and a first radius of a sphere covering a real object underlying the first three-dimensional point cloud and a second radius of a sphere covering a real object underlying the second three-dimensional point cloud;
defining a scale of the first three-dimensional point cloud based on said first radius and a scale of the second three-dimensional point cloud based on said second radius;
searching at least some candidate regions between the first three-dimensional point cloud and the second three-dimensional point cloud using an ensemble shape function (ESF);
aligning the searched candidate regions between the first three-dimensional point cloud and the second three-dimensional point cloud at least in a vertical direction; and
ranking the aligned candidate regions between the three-dimensional point clouds based on their structural similarity.

16. The non-transitory computer readable storage medium according to claim 15, wherein the first three-dimensional point cloud is obtained using Light Detection And Ranging (LiDAR) technique and the second three-dimensional point cloud is obtained using Structure-From-Motion (SFM) technique.

17. The non-transitory computer readable storage medium according to claim 16, wherein said code is configured to, with the at least one processor, cause the apparatus to at least:
determine multiple radii of spheres covering the real object underlying the first three-dimensional point cloud obtained using Light Detection And Ranging technique;
define multiple scales of said first three-dimensional point cloud on the basis of said multiple radii; and
search at least some candidate regions between the multiple scales of said first three-dimensional point cloud and the second three-dimensional point cloud using the ensemble shape function (ESF).

18. The non-transitory computer readable storage medium according to claim 15, wherein said code is configured to, with the at least one processor, cause the apparatus to at least:
searching at least some candidate regions between the first three-dimensional point cloud and the second three-dimensional point cloud using a multi-resolution ensemble shape function, wherein at least said first three-dimensional point cloud is processed in at least two different three-dimensional resolutions.

19. The non-transitory computer readable storage medium according to claim 18, wherein said code is configured to, with the at least one processor, cause the apparatus to at least:
search at least some candidate regions between the first three-dimensional point cloud and the second three-dimensional point cloud using a first lower resolution for said first three-dimensional point cloud;
select a subset of candidate regions of said first three-dimensional point cloud; and
search, from said subset of candidate regions, at least some candidate regions between the first three-dimensional point cloud and the second three-dimensional point cloud using a second higher resolution for said first three-dimensional point cloud.

20. The non-transitory computer readable storage medium according to claim 15, wherein said code is configured to, with the at least one processor, cause the apparatus to at least:
rank the aligned candidate regions between the three-dimensional point clouds according to an iterative closest point (ICP) method, wherein a search between the first three-dimensional point cloud and the second three-dimensional point cloud is carried out in the vertical direction.

* * * * *